United States Patent
Tang

(10) Patent No.: US 11,638,303 B2
(45) Date of Patent: *Apr. 25, 2023

(54) METHOD, NETWORK DEVICE, AND TERMINAL DEVICE FOR CHANNEL TRANSMISSION ON UNLICENSED SPECTRUM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/850,950

(22) Filed: Jun. 27, 2022

(65) Prior Publication Data

US 2022/0330343 A1 Oct. 13, 2022

Related U.S. Application Data

(63) Continuation of application No. 17/086,858, filed on Nov. 2, 2020, now Pat. No. 11,388,752, which is a continuation of application No. PCT/CN2018/090707, filed on Jun. 11, 2018.

(51) Int. Cl.
*H04W 74/08* (2009.01)
*H04W 16/14* (2009.01)
*H04W 80/02* (2009.01)

(52) U.S. Cl.
CPC ....... *H04W 74/0816* (2013.01); *H04W 16/14* (2013.01); *H04W 80/02* (2013.01)

(58) Field of Classification Search
CPC ............. H04W 16/14; H04W 74/0808; H04W 74/0816; H04W 80/02
See application file for complete search history.

(56) References Cited

U.S. PATENT DOCUMENTS

| | | | |
|---|---|---|---|
| 9,326,157 | B1 | 4/2016 | Bhorkar et al. |
| 9,788,212 | B2 | 10/2017 | Bhorkar et al. |
| 10,129,870 | B2 | 11/2018 | Li et al. |
| 2016/0135055 | A1 | 5/2016 | Bhorkar et al. |
| 2016/0309334 | A1 | 10/2016 | Bhorkar et al. |

(Continued)

FOREIGN PATENT DOCUMENTS

| | | |
|---|---|---|
| CN | 105307179 A | 2/2016 |
| CN | 106470474 A | 3/2017 |

(Continued)

OTHER PUBLICATIONS

3GPP TSG RAN WG1 Meeting #92bis R1-1803778. "Frame Structure for NR Unlicensed Operations" No. 7.6.2. Apr. 20, 2018 (Apr. 20, 2018), entire document (considered in parent U.S. Appl. No. 17/086,858).

(Continued)

*Primary Examiner* — Saad A. Waqas
(74) *Attorney, Agent, or Firm* — Ladas & Parry, LLP

(57) ABSTRACT

A method for channel transmission on an unlicensed spectrum, includes that: within the range of time of channel occupation by a first unlicensed carrier, channel sensing is performed on at least one second unlicensed carrier.

18 Claims, 3 Drawing Sheets

(56) References Cited

U.S. PATENT DOCUMENTS

| | | | |
|---|---|---|---|
| 2017/0064702 A1 | 3/2017 | Li et al. | |
| 2018/0035303 A1 | 2/2018 | Bhorkar et al. | |
| 2018/0092043 A1* | 3/2018 | Yerramalli | H04W 28/26 |
| 2018/0343205 A1* | 11/2018 | Lei | H04L 1/1812 |
| 2019/0069312 A1* | 2/2019 | Oh | H04L 5/0092 |
| 2019/0394798 A1* | 12/2019 | Tomeba | H04W 72/1268 |
| 2021/0153249 A1* | 5/2021 | Li | H04B 7/088 |
| 2021/0235491 A1* | 7/2021 | Iyer | H04W 72/042 |
| 2021/0235492 A1* | 7/2021 | Iyer | H04L 5/001 |

FOREIGN PATENT DOCUMENTS

| | | | |
|---|---|---|---|
| CN | 106797572 A | 5/2017 | |
| CN | 107770872 A | 3/2018 | |
| CN | 108029021 A | 5/2018 | |
| WO | 2018071068 A1 | 4/2018 | |

OTHER PUBLICATIONS

International Search Report in the international application No. PCT/CN2018/090707, dated Jan. 9, 2019 (considered in parent U.S. Appl. No. 17/086,858).

Written Opinion in the international application No. PCT/CN2018/090707, dated Jan. 9, 2019, with English translation provided by WIPO (considered in parent U.S. Appl. No. 17/086,858).

Supplementary European Search Report in the European application No. 18922896.8, dated May 28, 2021, entire document (Considered in parent U.S. Appl. No. 17/086,858).

First Office Action of the U.S. Appl. No. 17/086,858, dated Nov. 26, 2021.

Notice of Allowance of the U.S. Appl. No. 17/086,858, dated Mar. 16, 2022.

First Office Action of the European application No. 18922896.8, dated Feb. 7, 2023.

\* cited by examiner

METHOD, NETWORK DEVICE, AND TERMINAL DEVICE FOR CHANNEL TRANSMISSION ON UNLICENSED SPECTRUM

CROSS-REFERENCE TO RELATED APPLICATIONS

This is a continuation application of U.S. patent application Ser. No. 17/086,858 filed on Nov. 2, 2020, which is a continuation of International Patent Application No. PCT/CN2018/090707, filed on Jun. 11, 2018, the contents of which are hereby incorporated by reference in their entireties.

BACKGROUND

The Licensed-Assisted Access (LAA) has been approved in the 65th session of the 3rd Generation Partnerships Project (3GPP) Radio Access Network (RAN), such that a Long Term Evolution (LTE) technology can be used on an unlicensed spectrum for communication. The unlicensed spectrum is a spectrum which is assigned based on countries and regions and available for wireless devices in communication. The spectrum is generally deemed as a shared spectrum. In order to ensure the fairness, the time period during which a communication device transmits a signal by using a channel on the unlicensed spectrum in a single transmission cannot exceed the Maximum Channel Occupation Time (MCOT).

According to the regulatory requirements, before transmitting a signal via an unlicensed spectrum, the communication device needs to perform Clear Channel Assessment (CCA). The communication device can transmit the signal only when a result of channel sensing is that the channel is idle. If the channel access process is finished, a network device may transmit a Physical Downlink Shared Channel (PDSCH)/Physical Downlink Control Channel (PDCCH)/Enhanced Physical Downlink Control Channel (EPDCCH) and a Demodulation Reference Signal (DRS), wherein the $CW_p$ (Contention Window$_p$) and the $m_p$ may be determined according to a priority of a service and may be as illustrated in the table below:

| Channel access priority class (p) | $m_p$ | $CW_{min, p}$ | $CW_{max, p}$ | $T_{mcot, p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As can be seen from the table, the MCOT varies for different access priorities but is only 10 ms at most. If the communication device needs to continue to use the channel, the channel cannot be reacquired until the CCA is carried out again and the result of the CCA is that the channel is idle. There is no problem that a base station simultaneously receives signals on different carriers at the same moment or simultaneously transmits signals on different carriers at the same moment. However, if the base station receives the signal on the first carrier and transmits the signal on the second carrier at the same moment, the signal will leak to cause the interference. In the unlicensed spectrum, signals may also be simultaneously received and transmitted in unlicensed carriers that meet a certain interval. Based on the simultaneous receiving and transmitting capability of the base station for carriers of different frequencies in a New Radio (NR) system, in the unlicensed spectrum, it is possible to transmit a downlink channel on one unlicensed carrier and perform CCA channel sensing on another unlicensed carrier, so as to acquire a channel of the another unlicensed carrier before the COT of the current unlicensed carrier ends; or otherwise, the CAA performed on the current unlicensed carrier cannot continue until the COT ends, which interrupts the transmission of downlink channel.

SUMMARY

Embodiments of the disclosure relate to the field of information processing, and more particularly to a method, network device and terminal device for channel transmission on an unlicensed spectrum.

An embodiment of the disclosure provides a method for channel transmission on an unlicensed spectrum, which may be applied to a network device, and include the following operation.

Channel sensing is performed on at least one second unlicensed carrier within a range of Channel Occupation Time (COT) of a first unlicensed carrier.

An embodiment of the disclosure provides a method for channel transmission on an unlicensed spectrum, which may be applied to a terminal device, and include the following operation.

A channel or a signal is received or transmitted via at least one second unlicensed carrier within a range of COT of a first unlicensed carrier.

An embodiment of the disclosure provides a method for channel transmission on an unlicensed spectrum, which may be applied to a terminal device, and include the following operation.

Channel sensing is performed on at least one second unlicensed carrier within a range of COT of a first unlicensed carrier.

An embodiment of the disclosure provides a method for channel transmission on an unlicensed spectrum, which may be applied to a network device, and include the following operation.

Information or a signal is received or transmitted via at least one second unlicensed carrier within a range of COT of a first unlicensed carrier of a terminal device.

An embodiment of the disclosure provides a network device, which may include: a first processing unit, and a first communication unit.

The first processing unit is configured to control the first communication unit to perform channel sensing on at least one second unlicensed carrier within a range of COT of a first unlicensed carrier.

The first communication unit is configured to perform the channel sensing under the control of the first processing unit.

An embodiment of the disclosure provides a terminal device, which may include: a second communication unit.

The second communication unit is configured to receive or transmit a channel or a signal via at least one second unlicensed carrier within a range of COT of a first unlicensed carrier.

An embodiment of the disclosure provides a terminal device, which may include: a third processing unit and a third communication unit.

The third processing unit is configured to control the third communication unit to perform channel sensing or signal sensing on at least one second unlicensed carrier within a range of COT of a first unlicensed carrier.

The third communication unit is configured to perform the channel sensing or the signal sensing under the control of the third processing unit.

An embodiment of the disclosure provides a network device, which may include: a fourth communication unit.

The fourth communication unit is configured to transmit or receive information or a signal via at least one second unlicensed carrier within a range of COT of a first unlicensed carrier of a terminal device.

An embodiment of the disclosure provides a terminal device, which may include: a processor and a memory configured to store a computer program capable of running on the processor.

The processor is configured to run the computer program to execute the steps of the above methods.

An embodiment of the disclosure provides a network device, which may include: a processor and a memory configured to store a computer program capable of running on the processor.

The processor is configured to run the computer program to execute the steps of the above methods.

An embodiment of the disclosure provides a computer storage medium having stored therein computer executable instructions that when being executed, implement the steps of the above methods.

According to the technical solutions provided by the embodiments of the disclosure, while one unlicensed carrier is occupied, the channel sensing is performed on the second unlicensed carrier. Therefore, the unlicensed carrier in an idle state at present may be obtained timely for the transmission of the downlink channel or the downlink signal, thereby avoiding the interruption of channel transmission, and ensuring the continuity and high efficiency of the transmission.

DETAILED DESCRIPTION

For making the characteristics and technical contents of the embodiments of the disclosure understood in more detail, implementation of the embodiments of the disclosure will be described below in conjunction with the drawings in detail. The drawings are only adopted for illustration as references and not intended to limit the embodiments of the disclosure.

Embodiment 1

The embodiment of the disclosure provides a method for channel transmission on an unlicensed spectrum, which may be applied to a network device, and include the following operations.

Channel sensing is performed on at least one second unlicensed carrier within a range of COT of a first unlicensed carrier.

If a result of the channel sensing is idle, a downlink channel is transmitted via the second unlicensed carrier when the COT of the current unlicensed carrier ends or before the end of the COT of the current unlicensed carrier.

Specifically, if a result of the channel sensing on the at least one second unlicensed carrier is that there is an idle channel on a second unlicensed carrier, the downlink channel or the downlink signal is transmitted via the second unlicensed carrier having the idle channel before the end of the COT of the first unlicensed carrier or after the end of the COT of the first unlicensed carrier.

The relationship between the second unlicensed carrier and the first unlicensed carrier may meet a certain frequency interval, or both the second unlicensed carrier and the first unlicensed carrier are a predefined carrier combination; and the relationship between the second unlicensed carrier and the first unlicensed carrier may be allocated to the terminal through signaling.

In the embodiment, the specific processing manner for performing the sensing and performing the transmission of the downlink channel may include the following several scenarios.

Scenario 1

If it is acquired, within the range of the COT of the first unlicensed carrier, that the sensing result of the second unlicensed carrier is idle, the downlink channel or the downlink signal is transmitted via the second unlicensed carrier after the end of the COT of the first unlicensed carrier.

Figure 1:
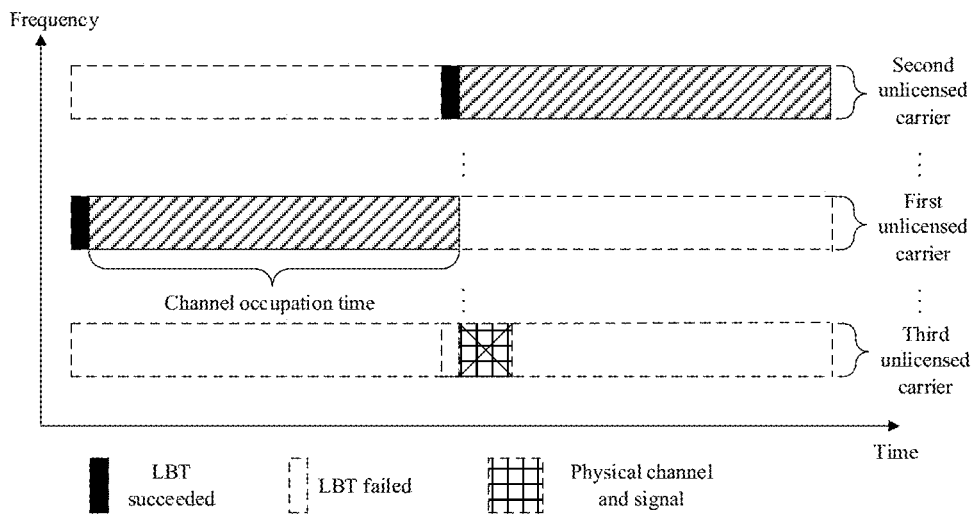
FIG. 1 is a first schematic diagram of a scenario of channel sensing and channel transmission according to an embodiment of the disclosure.

As illustrated in FIG. 1, if it is acquired, when the COT of the first unlicensed carrier ends, that the sensing result of the second unlicensed carrier is idle, the downlink channel is immediately transmitted via the second unlicensed carrier when the COT ends. As can further be seen from FIG. 1 that if it is acquired, when the COT of the first unlicensed carrier ends, that the sensing result of a third unlicensed carrier is non-idle, no signal is transmitted on the third unlicensed carrier.

Scenario 2

If it is acquired that the sensing result of the second unlicensed carrier is idle, a filling signal, and/or, the downlink channel or the downlink signal are/is transmitted via the second unlicensed carrier after it is acquired that the sensing result of the second unlicensed carrier is idle and before the end of the COT of the first unlicensed carrier.

The filling signal may be a signal which is preset according to an actual condition. For example, the 01 may be cyclically transmitted to obtain the filling signal, or the "1" may be repeated for N lengths to obtain the filling signal.

In addition, the downlink signal or the downlink channel may be directly transmitted before the end of the COT of the first unlicensed carrier.

Certainly, the above two cases do not necessarily exist in parallel, and may also exist concurrently. For example, it is possible to first transmit the filling signal for a first time period and then transmit the downlink channel or the downlink signal. The first time period may be set according to the actual condition.

During specific implementation, the above multiple cases may be used for transmitting. There are no limits made thereto in the embodiment.

Figure 2:
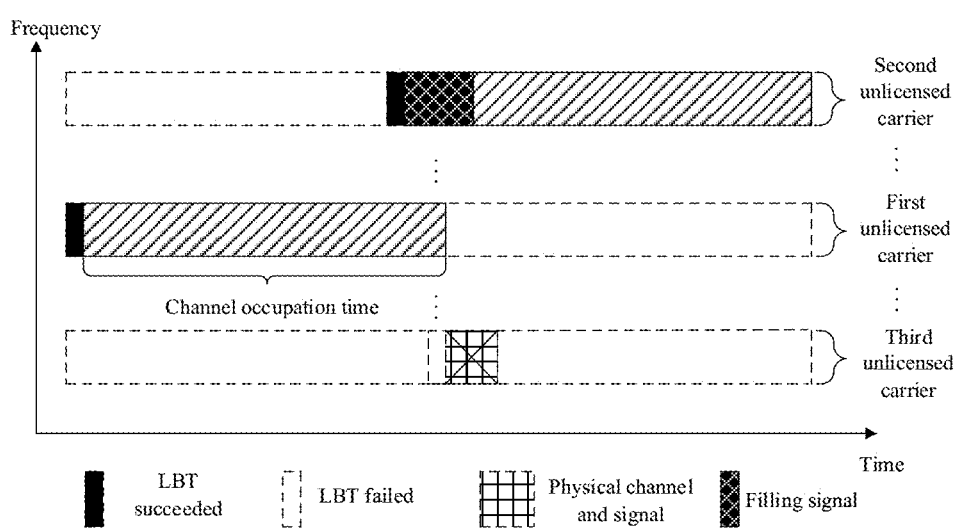
FIG. 2 is a second schematic diagram of a scenario of channel sensing and channel transmission according to an embodiment of the disclosure.

As illustrated in FIG. 2, if it is acquired before the end of the COT of the first unlicensed carrier that the sensing result of the second unlicensed carrier is idle, the filling signal is transmitted via the second unlicensed carrier before the end of the COT of the first unlicensed carrier, and then the downlink channel or the downlink signal is transmitted after the first filling signal is transmitted for a second time period. The second time period may be a time period from the start time of transmitting the filling signal via the second unlicensed carrier to the end of the COT of the first unlicensed carrier.

In addition, as can further be seen from FIG. 2 that if the sensing result of a third unlicensed carrier is non-idle, no signal is transmitted on the third unlicensed carrier.

Scenario 3

After it is acquired within the range of the COT of the first unlicensed carrier that the sensing result of the second unlicensed carrier is idle, transmitting the downlink channel or the downlink signal on the first unlicensed carrier is terminated, and the downlink channel or the downlink signal is transmitted via the second unlicensed carrier.

In other words, if it is determined before the end of the COT of the first unlicensed carrier that a result of Listen Before Talk (LBT) is idle, the channel transmission of the first unlicensed carrier is directly terminated, and the transmitting of the downlink channel or the downlink signal via the second unlicensed carrier is started.

Figure 3:
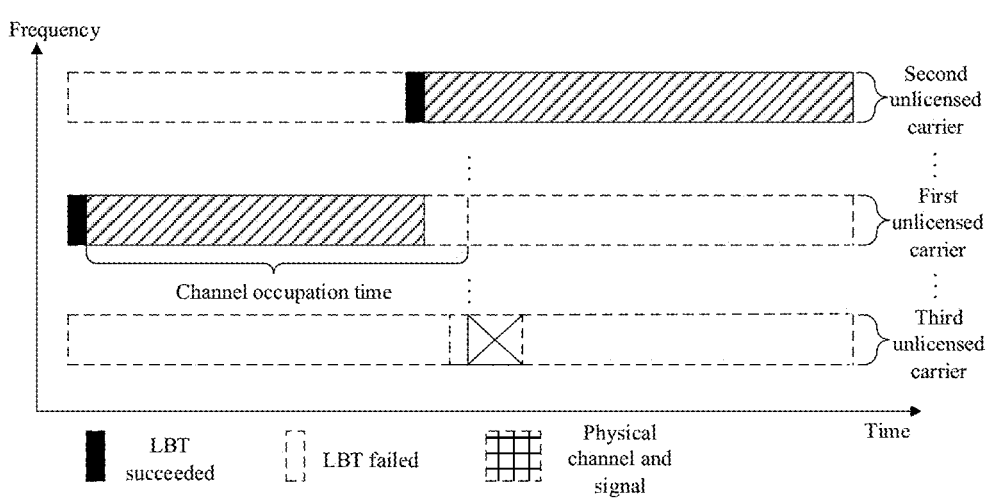
FIG. 3 is a third schematic diagram of a scenario of channel sensing and channel transmission according to an embodiment of the disclosure.

As illustrated in FIG. 3, if it is acquired before the end of the COT of the first unlicensed carrier that the sensing result of the second carrier is idle, transmitting and receiving the channel on the first unlicensed carrier is terminated in advance; and upon the success of the LBT, the channel is transmitted and received immediately via the second unlicensed carrier.

In addition, as can further be seen from FIG. 3 that if the sensing result of a third unlicensed carrier is non-idle, no signal is transmitted on the third unlicensed carrier.

Figure 4:
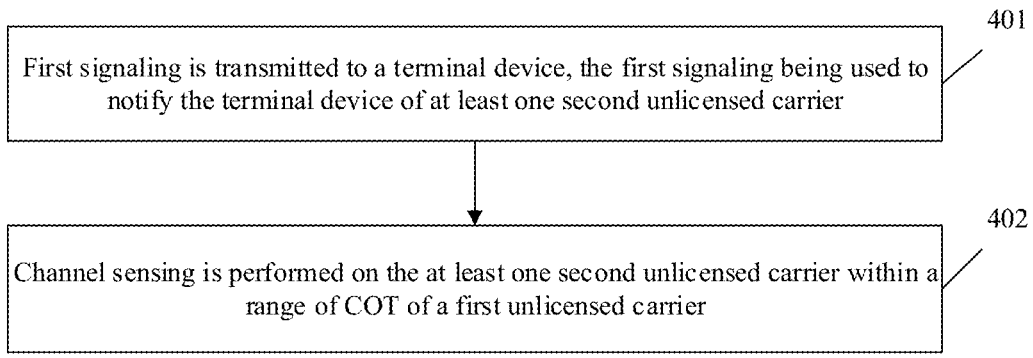
FIG. 4 is a first flowchart schematic diagram of a method for channel transmission on an unlicensed spectrum according to an embodiment of the disclosure.

The solutions provided by the embodiment are described in conjunction with FIG. 4, and may include the following operations.

At 401: a first signaling is transmitted to a terminal device, the first signaling being used to notify the terminal device of at least one second unlicensed carrier.

At 402: channel sensing is performed on the at least one second unlicensed carrier within a range of COT of a first unlicensed carrier.

Herein, the first signaling may be scheduling information on the second unlicensed carrier.

The first signaling is a high-level signaling, or a physical layer signaling.

The signaling is the high-level signaling such as Radio Resource Control (RRC) signaling. The signaling is the physical layer signaling such as scheduling signaling in Downlink Control Information (DCI).

As can be seen, by adopting the above solutions, while one unlicensed carrier is occupied, the channel sensing is performed on the second unlicensed carrier. Therefore, the unlicensed carrier in an idle state at present may be obtained timely for the transmission of the downlink channel or the downlink signal, thereby avoiding the interruption of channel transmission, and ensuring the continuity and high efficiency of the transmission.

Embodiment 2

Corresponding to Embodiment 1, the processing at the terminal device side is described in the present embodiment. The embodiment provides a method for channel transmission on an unlicensed spectrum, which may be applied to a terminal device, and include the following operation.

A channel or a signal is received or transmitted via at least one second unlicensed carrier within a range of COT of a first unlicensed carrier.

The relationship between the second unlicensed carrier and the first unlicensed carrier may meet a certain frequency interval, or both the second unlicensed carrier and the first unlicensed carrier are a predefined carrier combination; and the relationship between the second unlicensed carrier and the first unlicensed carrier may be allocated to the terminal through signaling.

Figure 5:
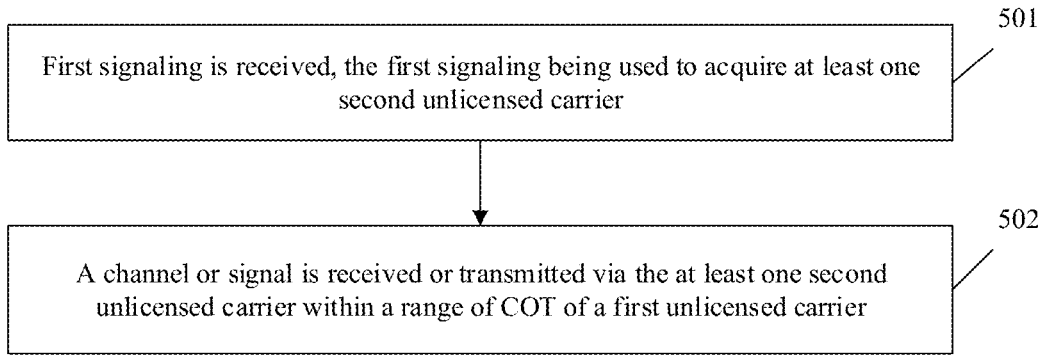
FIG. 5 is a second flowchart schematic diagram of a method for channel transmission on an unlicensed spectrum according to an embodiment of the disclosure.

Specifically, the description is made in conjunction with FIG. 5.

At 501: a first signaling is received, the first signaling being used to acquire at least one second unlicensed carrier.

At 502: a channel or a signal is received or transmitted via the at least one second unlicensed carrier within a range of COT of a first unlicensed carrier.

The first signaling is a high-level signaling, or a physical layer signaling.

Herein, the first signaling may be scheduling information on the second unlicensed carrier.

The first signaling is a high-level signaling, or a physical layer signaling.

The signaling is the high-level signaling such as RRC signaling. The signaling is the physical layer signaling such as scheduling signaling in DCI.

As can be seen, by adopting the above solutions, while one unlicensed carrier is occupied, the channel sensing is performed on the second unlicensed carrier. Therefore, the unlicensed carrier in an idle state at present may be obtained timely for the transmission of the downlink channel or the downlink signal, thereby avoiding the interruption of channel transmission, and ensuring the continuity and high efficiency of the transmission.

Embodiment 3

The embodiment provides a method for channel transmission on an unlicensed spectrum, which may be applied to a terminal device, and include the following operation.

Channel sensing or signal sensing is performed on at least one second unlicensed carrier within a range of COT of a first unlicensed carrier.

The relationship between the second unlicensed carrier and the first unlicensed carrier may meet a certain frequency interval, or both the second unlicensed carrier and the first unlicensed carrier are a predefined carrier combination; and the relationship between the second unlicensed carrier and the first unlicensed carrier may be allocated to the terminal through signaling.

Figure 6:
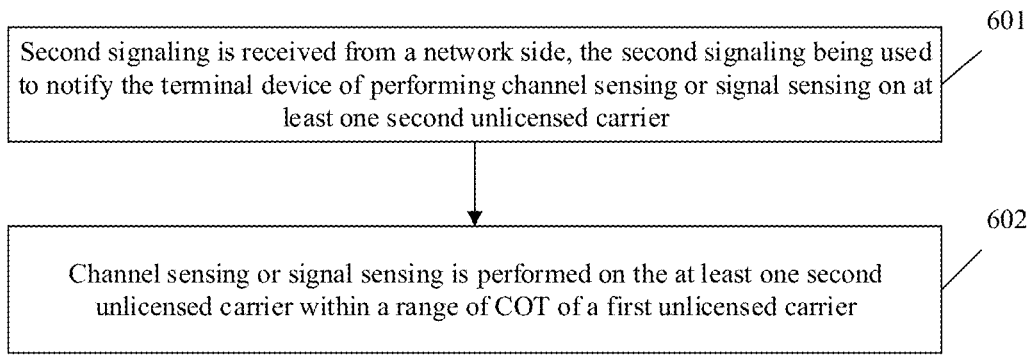
FIG. 6 is a third flowchart schematic diagram of a method for channel transmission on an unlicensed spectrum according to an embodiment of the disclosure.

Specifically, the solutions provided by the embodiment are described in conjunction with FIG. 6.

At 601: a second signaling is received from a network side, the second signaling being used to notify the terminal device of performing channel sensing or signal sensing on at least one second unlicensed carrier.

At 602: channel sensing or signal sensing is performed on the at least one second unlicensed carrier within a range of COT of a first unlicensed carrier.

The terminal device receives the second signaling from the network device, and the signaling is used to notify the terminal device of performing the channel sensing on the at least one second unlicensed carrier.

The second signaling further includes: time for notifying the terminal device of performing the channel sensing or signal sensing on the at least one second unlicensed carrier.

It is further to be noted that within the time for the channel sensing, no channel or no signal is transmitted on the first unlicensed carrier, or, no channel or no signal is transmitted and received on the first unlicensed carrier.

In other words, in a case that the terminal device does not have a capability for simultaneously receiving and transmitting, when a sensing is performed on the second unlicensed carrier, no channel is transmitted on the first unlicensed carrier. By this time, the channel can be received on the first unlicensed carrier; or no channel is transmitted and received on the first unlicensed carrier.

The method may further include the following operation.

Capability information is reported to the network side, the capability information at least including: an information about whether the terminal device has a capability of simultaneously receiving and transmitting on different carriers.

In other words, the terminal device reports the capability information to the network device, the capability information including an information about a capability of simultaneously receiving and transmitting on different carriers, or a capability of simultaneously performing channel sensing or signal sensing on the second carrier.

Specifically, the capability of simultaneously receiving and transmitting on the different carriers may include: simultaneously transmitting on the different carriers, and simultaneously receiving on the different carriers, and may further include: transmitting on one carrier and receiving on another carrier. The latter is the main capability in the embodiment.

The method may further include the following operation.

When the terminal device has the capability of simultaneously receiving and transmitting on the different carriers, the channel or the signal is transmitted and received on the first unlicensed carrier within the time for the channel sensing.

It is further to be noted that, in the embodiment, the specific processing manner for performing the sensing and transmitting the channel involved in Embodiment 1 may also be executed and may include the following several scenarios.

Scenario 1

If it is acquired, within the range of the COT of the first unlicensed carrier, that the sensing result of the second unlicensed carrier is idle, the downlink channel or the downlink signal is transmitted via the second unlicensed carrier after the end of the COT of the first unlicensed carrier.

For example, if it is acquired, when the COT of the first unlicensed carrier ends, that the sensing result of the second unlicensed carrier is idle, the channel is immediately transmitted via the second unlicensed carrier when the COT ends. If it is acquired, when the COT of the first unlicensed carrier ends, that the sensing result of a third unlicensed carrier is non-idle, no signal is transmitted on the third unlicensed carrier.

Scenario 2

If it is acquired within the range of the COT of the first unlicensed carrier that the sensing result of the second unlicensed carrier is idle, a filling signal, and/or, the downlink channel or the downlink signal are/is transmitted via the second unlicensed carrier after the it is acquired that the sensing result of the second unlicensed carrier is idle and before the end of the COT of the first unlicensed carrier.

For example, if it is acquired before the end of the COT of the first unlicensed carrier that the sensing result of the second unlicensed carrier is idle, the filling signal is transmitted via the second unlicensed carrier before the end of the COT of the first unlicensed carrier, and then the channel or signal is transmitted after the first filling signal is transmitted for a second time period. The second time period may be a time period from the start time of transmitting the filling signal via the second unlicensed carrier to the end of the COT of the first unlicensed carrier. In addition, if the sensing result of a third unlicensed carrier is non-idle, no signal is transmitted on the third unlicensed carrier.

Scenario 3

After it is acquired within the range of the COT of the first unlicensed carrier that the sensing result of the second unlicensed carrier is idle, the first unlicensed carrier is terminated transmitting the downlink channel or the downlink signal, and the channel or the signal is transmitted via the second unlicensed carrier.

In other words, if it is determined before the end of the COT of the first unlicensed carrier that a result of LBT is idle, the channel transmission of the first unlicensed carrier is directly terminated, and the transmitting of the channel or the signal via the second unlicensed carrier is started. If it is acquired before the end of the COT of the first unlicensed carrier that the sensing result of the second carrier is idle, transmitting and receiving the channel on the first unlicensed carrier is terminated in advance; and upon the success of the LBT, the channel is transmitted and received immediately via the second unlicensed carrier. In addition, if the sensing result of a third unlicensed carrier is non-idle, no signal is transmitted on the third unlicensed carrier.

As can be seen, by adopting the above solutions, while one unlicensed carrier is occupied, the channel sensing is performed on the second unlicensed carrier. Therefore, the unlicensed carrier in an idle state at present may be obtained timely for the transmission of the downlink channel or the downlink signal, thereby avoiding the interruption of channel transmission, and ensuring the continuity and high efficiency of the transmission.

Embodiment 4

Corresponding to Embodiment 3, the embodiment provides a method for channel transmission on an unlicensed spectrum, which may be applied to a network device, and include the following operation.

A channel or a signal is transmitted via at least one second unlicensed carrier within a range of COT of a first unlicensed carrier of a terminal device.

The terminal device performs channel sensing on the at least one second unlicensed carrier before the end of the COT of the first unlicensed carrier.

Specifically, second signaling is transmitted to the terminal device, the second signaling being used to notify the terminal device of performing channel sensing or signal sensing on the at least one second unlicensed carrier.

The second signaling further includes: time for notifying the terminal device of performing the channel sensing or signal sensing on the at least one second unlicensed carrier.

It is further to be noted that within the time for the channel sensing, no channel or no signal is transmitted on the first unlicensed carrier, or, no channel or no signal is transmitted and received on the first unlicensed carrier.

In other words, in a case that the terminal device does not have a capability for simultaneously receiving and transmitting, when a sensing is performed on the second unlicensed carrier, no channel is transmitted on the first unlicensed carrier. By this time, the channel can be received on the first unlicensed carrier; or no channel is transmitted and received on the first unlicensed carrier.

The method may further include that: capability information reported by the terminal device is received, the capability information at least including: an information about whether the terminal device has a capability of simultaneously receiving and transmitting on different carriers.

In other words, the terminal device reports the capability information to the network device, the capability information including an information about a capability of simultaneously receiving and transmitting on different carriers, or a capability of simultaneously performing channel sensing or signal sensing on the second carrier.

It is further to be understood that the embodiment can further execute several scenarios on sensing and transmission time mentioned in Embodiment 3, and details are not elaborated.

As can be seen, while one unlicensed carrier is occupied, the channel sensing is performed on the second unlicensed carrier. Therefore, the unlicensed carrier in an idle state at present may be obtained timely for the transmission of the downlink channel or the downlink signal, thereby avoiding the interruption of channel transmission, and ensuring the continuity and high efficiency of the transmission.

Embodiment 5

Figure 7:
FIG. 7 is a compositional and structural schematic diagram of a network device according to an embodiment of the disclosure.

The embodiment of the disclosure provides a network device. As illustrated in FIG. 7, the network device may include: a first processing unit 71 and a first communication unit 72.

The first processing unit 71 is configured to control the first communication unit to perform channel sensing on at least one second unlicensed carrier within a range of COT of a first unlicensed carrier.

The first communication unit 72 is configured to perform the channel sensing under the control of the first processing unit.

If a result of the channel sensing is idle, a downlink channel is transmitted via the second unlicensed carrier when the COT of the current unlicensed carrier ends or before the end of the COT of the current unlicensed carrier.

Specifically, the first processing unit 71 is configured to: if a result of the channel sensing on the at least one second unlicensed carrier is that there is an idle channel on a second unlicensed carrier, control the first communication unit 72 to transmit the downlink channel or the downlink signal via the second unlicensed carrier having the idle channel before the end of the COT of the first unlicensed carrier or after the end of the COT of the first unlicensed carrier.

The relationship between the second unlicensed carrier and the first unlicensed carrier may meet a certain frequency interval, or both the second unlicensed carrier and the first unlicensed carrier are a predefined carrier combination; and the relationship between the second unlicensed carrier and the first unlicensed carrier may be allocated to the terminal through signaling.

In the embodiment, the specific processing manner for performing the sensing and transmitting the downlink channel may include the following several scenarios.

Scenario 1

The first processing unit 71 is configured to: if it is acquired within the range of the COT of the first unlicensed carrier that the sensing result of the second unlicensed carrier is idle, control the first communication unit 72 to transmit the downlink channel or the downlink signal via the second unlicensed carrier after the end of the COT of the first unlicensed carrier.

As illustrated in FIG. 1, if it is acquired, when the COT of the first unlicensed carrier ends, that the sensing result of the second unlicensed carrier is idle, the downlink channel is immediately transmitted via the second unlicensed carrier when the COT ends. As can further be seen from FIG. 1 that if it is acquired, when the COT of the first unlicensed carrier ends, that the sensing result of a third unlicensed carrier is non-idle, no signal is transmitted on the third unlicensed carrier.

Scenario 2

The first processing unit 71 is configured to: if it is acquired within the range of the COT of the first unlicensed carrier that the sensing result of the second unlicensed carrier is idle, control the first communication unit 72 to transmit a filling signal, and/or, transmit the downlink channel or the downlink signal via the second unlicensed carrier after it is acquired that the sensing result of the second unlicensed carrier is idle and before the end of the COT of the first unlicensed carrier.

The filling signal may be a signal which is preset according to an actual condition. For example, the 01 may be cyclically transmitted to obtain the filling signal, or the "1" may be repeated for N lengths to obtain the filling signal.

In addition, the downlink signal or the downlink channel may be directly transmitted before the end of the COT of the first unlicensed carrier.

Certainly, the above two cases do not necessarily exist in parallel, and may also exist concurrently. For example, it is possible to first transmit the filling signal for a first time period and then transmit the downlink channel or the downlink signal. The first time period may be set according to the actual condition.

During specific implementation, the above multiple cases may be used for transmitting. There are no limits made thereto in the embodiment.

As illustrated in FIG. 2, if it is acquired before the end of the COT of the first unlicensed carrier that the sensing result of the second unlicensed carrier is idle, the filling signal is transmitted via the second unlicensed carrier before the end of the COT of the first unlicensed carrier, and then the downlink channel or the downlink signal is transmitted after the first filling signal is transmitted for a second time period. The second time period may be a time period from the start time of transmitting the filling signal via the second unlicensed carrier to the end of the COT of the first unlicensed carrier.

In addition, as can further be seen from FIG. 2 that if the sensing result of a third unlicensed carrier is non-idle, no signal is transmitted on the third unlicensed carrier.

Scenario 3

The first processing unit 71 is configured to: after it is acquired within the range of the COT of the first unlicensed carrier that the sensing result of the second unlicensed carrier is idle, terminate transmitting the downlink channel or the downlink signal on the first unlicensed carrier, and control the first communication unit 72 to transmit the downlink channel or the downlink signal via the second unlicensed carrier.

In other words, if it is determined before the end of the COT of the first unlicensed carrier that result of LBT is idle, the channel transmission of the first unlicensed carrier is directly terminated, and the downlink channel or the downlink signal is transmitted via the second unlicensed carrier.

As illustrated in FIG. 3, if it is acquired before the end of the COT of the first unlicensed carrier that the sensing result of the second unlicensed carrier is idle, transmitting and receiving the channel on the first unlicensed carrier is terminated in advance; and upon the success of the LBT, the channel is transmitted and received immediately via the second unlicensed carrier.

In addition, as can further be seen from FIG. 3 that if the sensing result of a third unlicensed carrier is non-idle, no signal is transmitted on the third unlicensed carrier.

The first communication unit 72 is configured to transmit a first signaling to the terminal device, the first signaling being used to notify the terminal device of at least one second unlicensed carrier.

Herein, the first signaling may be scheduling information on the second unlicensed carrier.

The first signaling is a high-level signaling, or a physical layer signaling.

The signaling is the high-level signaling such as RRC signaling. The signaling is the physical layer signaling such as scheduling signaling in DCI.

As can be seen, by adopting the above solutions, while one unlicensed carrier is occupied, the channel sensing is performed on the second unlicensed carrier. Therefore, the unlicensed carrier in an idle state at present may be obtained timely for the transmission of the downlink channel or the downlink signal, thereby avoiding the interruption of channel transmission, and ensuring the continuity and high efficiency of the transmission.

Embodiment 6

Corresponding to Embodiment 1, the processing at the terminal device side is described in the embodiment. The terminal device may include: a second communication unit.

The second communication unit is configured to receive or transmit a channel or signal via at least one second unlicensed carrier within a range of COT of a first unlicensed carrier.

The relationship between the second unlicensed carrier and the first unlicensed carrier may meet a certain frequency interval, or both the second unlicensed carrier and the first unlicensed carrier are a predefined carrier combination; and the relationship between the second unlicensed carrier and the first unlicensed carrier may be allocated to the terminal through signaling.

The second communication unit is configured to receive a first signaling, the first signaling being used to acquire the at least one second unlicensed carrier.

The first signaling is a high-level signaling, or a physical layer signaling.

Herein, the first signaling may be scheduling information on the second unlicensed carrier.

The first signaling is a high-level signaling, or a physical layer signaling.

The signaling is the high-level signaling such as RRC signaling. The signaling is the physical layer signaling such as scheduling signaling in DCI.

As can be seen, by adopting the above solutions, while one unlicensed carrier is occupied, the channel sensing is performed on the second unlicensed carrier. Therefore, the unlicensed carrier in an idle state at present may be obtained timely for the transmission of the downlink channel or the downlink signal, thereby avoiding the interruption of channel transmission, and ensuring the continuity and high efficiency of the transmission.

Embodiment 7

Figure 8:
FIG. 8 is a compositional and structural schematic diagram of a terminal device according to an embodiment of the disclosure.

The embodiment provides a terminal device. As illustrated in FIG. 8, the terminal device may include: a third processing unit 81 and a third communication unit 82.

The third processing unit 81 is configured to control the third communication unit to perform channel sensing or signal sensing on at least one second unlicensed carrier within a range of COT of a first unlicensed carrier.

The third communication unit 82 performs the channel sensing or signal sensing under the control of the third processing unit.

The relationship between the second unlicensed carrier and the first unlicensed carrier may meet a certain frequency interval, or both the second unlicensed carrier and the first unlicensed carrier are a predefined carrier combination; and the relationship between the second unlicensed carrier and the first unlicensed carrier may be allocated to the terminal through signaling.

The third communication unit 82 is configured to receive a second signaling from a network side, the second signaling being used to notify the terminal device of performing channel sensing or signal sensing on the at least one second unlicensed carrier.

The second signaling further includes: time for notifying the terminal device of performing the channel sensing or signal sensing on the at least one second unlicensed carrier.

It is further to be noted that within the time for the channel sensing, no channel or no signal is transmitted on the first unlicensed carrier, or, no channel or no signal is transmitted and received on the first unlicensed carrier.

In other words, in a case that the terminal device does not have a capability for simultaneously receiving and transmitting, when a sensing is performed on the second unlicensed carrier, no channel is transmitted on the first unlicensed carrier. By this time, the channel can be received on the first unlicensed carrier; or no channel is transmitted and received on the first unlicensed carrier the first unlicensed carrier.

The third communication unit 82 is configured to report capability information to the network side, the capability information at least including: an information about whether the terminal device has a capability of simultaneously receiving and transmitting on different carriers.

In other words, the terminal device reports the capability information to the network device, the capability information including an information about a capability of simultaneously receiving and transmitting on different carriers, or a capability of simultaneously performing channel sensing or signal sensing on the second carrier.

The third processing unit 81 is configured to: if the terminal device has the capability of simultaneously receiving and transmitting on the different carriers, control the third communication unit 82 to transmit and receive the channel or signal on the first unlicensed carrier within the time for the channel sensing.

Specifically, the capability of simultaneously receiving and transmitting on the different carriers may include: simultaneously transmitting on the different carriers, and simultaneously receiving on the different carriers, and may further include: transmitting on one carrier and receiving on another carrier. The latter is the main capability in the embodiment.

It is further to be noted that, in the embodiment, the specific processing manner for performing the sensing and transmitting the channel involved in Embodiment 1 may also be executed and may include the following several scenarios.

Scenario 1

If it is acquired within the range of the COT of the first unlicensed carrier that the sensing result of the second unlicensed carrier is idle, the downlink channel or the downlink signal is transmitted via the second unlicensed carrier after the end of the COT of the first unlicensed carrier.

For example, if it is acquired, when the COT of the first unlicensed carrier ends, that the sensing result of the second unlicensed carrier is idle, the channel is immediately transmitted via the second unlicensed carrier when the COT ends. If it is acquired, when the COT of the first unlicensed carrier ends, that the sensing result of a third unlicensed carrier is non-idle, no signal is transmitted on the third unlicensed carrier.

Scenario 2

If it is acquired within the range of the COT of the first unlicensed carrier that the sensing result of the second unlicensed carrier is idle, a filling signal, and/or, the downlink channel or the downlink signal are/is transmitted via the second unlicensed carrier after it is acquired that the sensing result of the second unlicensed carrier is idle and before the end of the COT of the first unlicensed carrier.

For example, if it is acquired before the end of the COT of the first unlicensed carrier that the sensing result of the second unlicensed carrier is idle, the filling signal is transmitted via the second unlicensed carrier before the end of the COT of the first unlicensed carrier, and then the channel or signal is transmitted after the first filling signal is transmitted for a second time period. The second time period may be a time period from the start time of transmitting the filling signal via the second unlicensed carrier to the end of the COT of the first unlicensed carrier. In addition, if the sensing result of a third unlicensed carrier is non-idle, no signal is transmitted on the third unlicensed carrier.

Scenario 3

After it is acquired within the range of the COT of the first unlicensed carrier that the sensing result of the second unlicensed carrier is idle, transmitting the downlink channel or the downlink signal on the first unlicensed carrier is terminated, and the downlink channel or the downlink signal is transmitted via the second unlicensed carrier.

In other words, if it is determined before the end of the COT of the first unlicensed carrier that a result of LBT is idle, the channel transmission of the first unlicensed carrier is directly terminated, and the downlink channel or the downlink signal is transmitted via the second unlicensed carrier. If it is acquired before the end of the COT of the first unlicensed carrier that the sensing result of the second carrier is idle, transmitting and receiving the channel on the first unlicensed carrier is terminated in advance; and the channel is transmitted and received immediately via the second unlicensed carrier. In addition, if the sensing result of a third unlicensed carrier is non-idle, no signal is transmitted on the third unlicensed carrier.

As can be seen, by adopting the above solutions, while one unlicensed carrier is occupied, the channel sensing is performed on the second unlicensed carrier. Therefore, the unlicensed carrier in an idle state at present may be obtained timely for the transmission of the downlink channel or the downlink signal, thereby avoiding the interruption of channel transmission, and ensuring the continuity and high efficiency of the transmission.

Embodiment 8

The embodiment provides a network device, which may include: a fourth communication unit.

The fourth communication unit is configured to transmit or receive information or a signal via at least one second unlicensed carrier within a range of COT of a first unlicensed carrier of a terminal device.

The terminal device performs channel sensing on the at least one second unlicensed carrier before the end of the COT of the first unlicensed carrier.

Specifically, the fourth communication unit is configured to transmit a second signaling to the terminal device, the second signaling being used to notify the terminal device of performing channel sensing or signal sensing on the at least one second unlicensed carrier.

The second signaling further includes: time for notifying the terminal device of performing the channel sensing or signal sensing on the at least one second unlicensed carrier.

It is further to be noted that within the time for the channel sensing, no channel or no signal is transmitted on the first unlicensed carrier, or, no channel or no signal is transmitted and received on the first unlicensed carrier.

In other words, in a case that the terminal device does not have a capability for simultaneously receiving and transmitting, when a sensing is performed on the second unlicensed carrier, no channel is transmitted on the first unlicensed carrier. By this time, the channel can be received on the first unlicensed carrier; or no channel is transmitted and received on the first unlicensed carrier.

The fourth communication unit is configured to receive capability information reported by the terminal device, the capability information at least including: an information about whether the terminal device has a capability of simultaneously receiving and transmitting on different carriers.

In other words, the terminal device reports the capability information to the network device, the capability information including an information about a capability of simultaneously receiving and transmitting on different carriers, or a capability of simultaneously performing channel sensing or signal sensing on the second carrier.

It is further to be understood that the embodiment can further execute several scenarios on sensing and transmission time mentioned in Embodiment 3, and details are not elaborated.

As can be seen, by adopting the above solutions, while one unlicensed carrier is occupied, the channel sensing is performed on the second unlicensed carrier. Therefore, the unlicensed carrier in an idle state at present may be obtained timely for the transmission of the downlink channel or the downlink signal, thereby avoiding the interruption of channel transmission, and ensuring the continuity and high efficiency of the transmission.

Figure 9:
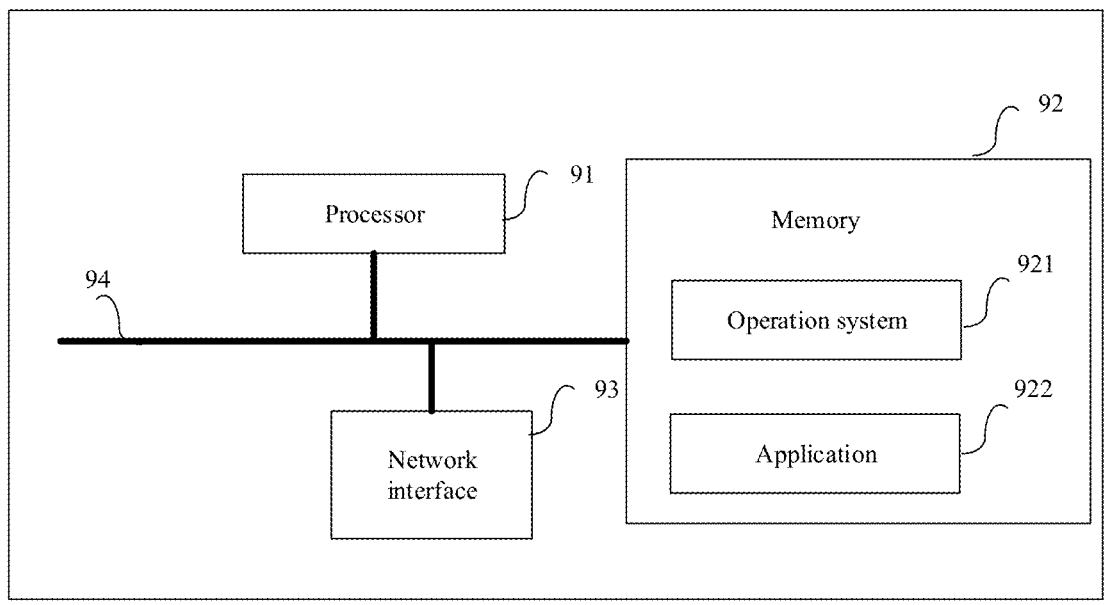
FIG. 9 is a compositional and structural schematic diagram of hardware according to an embodiment of the disclosure.

An embodiment of the disclosure further provides a hardware compositional architecture of a terminal device or a network device. As illustrated in FIG. 9, the hardware compositional architecture may include: at least one processor 91, a memory 92, and at least one network interface 93. Each assembly is coupled together via a bus system 94. It may be understood that the bus system 94 is configured to implement connection and communication among these assemblies. In addition to a data bus, the bus system 94 may further include a power bus, a control bus and a state signal bus. For ease of clarity, each bus in FIG. 9 is labeled as the bus system 94.

It can be understood that the memory 92 in the embodiment of the disclosure may be a volatile memory or a nonvolatile memory, or may include both the volatile and nonvolatile memories.

In some implementation manners, the memory 92 stores the following elements: an executable module or data structure, or a subset thereof, or a superset thereof:
an operation system 921 and an application 922.

The processor 91 is configured to: be able to process the steps of the method in any one of Embodiment 1 to Embodiment 4; and details are not elaborated.

An embodiment of the disclosure provides a computer storage medium, which stores a computer executable instruction; and the computer executable instruction is executed to implement the steps of the method in any one of Embodiment 1 to Embodiment 4.

When being implemented in form of software functional module and sold or used as an independent product, the apparatus of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Although the preferred embodiments of the disclosure have been disclosed exemplarily, it is appreciated for those skilled in the art that various improvements, additions and replacements may also be made. Therefore, the scope of the disclosure should not be limited to the above embodiments.

The invention claimed is:

1. A method for channel transmission on an unlicensed spectrum, applied to a network device, comprising:
   performing channel sensing on at least one second unlicensed carrier within a range of Channel Occupation Time (COT) of a first unlicensed carrier; and
   acquiring, within the range of the COT of the first unlicensed carrier, that a sensing result of a second unlicensed carrier is idle, then transmitting a downlink channel or a downlink signal via the second unlicensed carrier when the COT of the first unlicensed carrier ends.

2. The method of claim 1, further comprising:
   if a result of the channel sensing on the at least one second unlicensed carrier is that there is an idle channel on the second unlicensed carrier, transmitting a the downlink channel or the downlink signal via the second unlicensed carrier having the idle channel before an end of the COT of the first unlicensed carrier or after an end of the COT of the first unlicensed carrier.

3. The method of claim 2, further comprising:
   if the network device acquires, within the range of the COT of the first unlicensed carrier, that a the sensing result of the second unlicensed carrier is idle, transmitting a filling signal, and/or, the downlink channel or the downlink signal via the second unlicensed carrier after the network device acquires that the sensing result of the second unlicensed carrier is idle and before the end of the COT of the first unlicensed carrier.

4. The method of claim 2, further comprising:
   after the network device acquires, within the range of the COT of the first unlicensed carrier, that the sensing result of the second unlicensed carrier is idle, terminating channel transmission of the first unlicensed carrier, and transmitting the downlink channel or the downlink signal via the second unlicensed carrier.

5. The method of claim 1, further comprising:
   transmitting a first signaling to a terminal device, the first signaling being used to notify the terminal device of the at least one second unlicensed carrier.

6. The method of claim 5, wherein the first signaling is a high-level signaling or a physical layer signaling.

7. A method for channel transmission on an unlicensed spectrum, applied to a terminal device, comprising:
   receiving a downlink channel or a downlink signal via an idle second unlicensed carrier of at least one second unlicensed carrier when Channel Occupation Time (COT) of a first unlicensed carrier ends.

8. The method of claim 7, further comprising:
   receiving a first signaling, the first signaling being used to acquire the at least one second unlicensed carrier.

9. The method of claim 8, wherein the first signaling is a high-level signaling or a physical layer signaling.

10. A network device, comprising:
    a processor, configured to control a network interface to perform channel sensing on at least one second unlicensed carrier within a range of Channel Occupation Time (COT) of a first unlicensed carrier; and
    the network interface, configured to perform the channel sensing under the control of the processor,
    wherein the processor is configured to acquire, within the range of the COT of the first unlicensed carrier, that a sensing result of a second unlicensed carrier is idle, and control the network interface to transmit a downlink channel or a downlink signal via the second unlicensed carrier when the COT of the first unlicensed carrier ends.

11. The network device of claim 10, wherein the processor is configured to: if a result of the channel sensing on the at least one second unlicensed carrier is that there is an idle channel on the second unlicensed carrier, control the network interface to transmit the downlink channel or the downlink signal via the second unlicensed carrier having the idle channel before an end of the COT of the first unlicensed carrier or after an end of the COT of the first unlicensed carrier.

12. The network device of claim 11, wherein the processor is configured to: if it is acquired, within the range of the COT of the first unlicensed carrier, that the sensing result of the second unlicensed carrier is idle, control the network interface to transmit a filling signal, and/or, the downlink channel or the downlink signal via the second unlicensed carrier after it is acquired that the sensing result of the second unlicensed carrier is idle and before the end of the COT of the first unlicensed carrier.

13. The network device of claim 11, wherein the processor is configured to:

after it is acquired, within the range of the COT of the first unlicensed carrier, that the sensing result of the second unlicensed carrier is idle, terminate transmitting the downlink channel or the downlink signal on the first unlicensed carrier, and control the network interface to transmit the downlink channel or the downlink signal via the second unlicensed carrier.

14. The network device of claim 10, wherein the network interface is configured to transmit a first signaling to the terminal device, the first signaling being used to notify the terminal device of the at least one second unlicensed carrier.

15. The network device of claim 14, wherein the first signaling is a high-level signaling or a physical layer signaling.

16. A terminal device, comprising:
a network interface, configured to receive a downlink channel or a downlink signal via an idle second unlicensed carrier of at least one second unlicensed carrier when Channel Occupation Time (COT) of a first unlicensed carrier ends.

17. The terminal device of claim 16, wherein the network interface is configured to receive a first signaling, the first signaling being used to acquire the at least one second unlicensed carrier.

18. The terminal device of claim 17, wherein the first signaling is a high-level signaling or a physical layer signaling.

* * * * *